US012069981B2

(12) United States Patent
Unruh

(10) Patent No.: US 12,069,981 B2
(45) Date of Patent: Aug. 27, 2024

(54) RESEARCH PLOT SEEDER WITH PLANTING UNITS CONTROLLED TO TRIP AT DIFFERENT TIMES TO CREATE ALIGNED ALLEYWAYS

(71) Applicant: Seed Research Equipment Solutions, LLC, South Hutchinson, KS (US)

(72) Inventor: Stacy L. Unruh, Haben, KS (US)

(73) Assignee: Seed Research Equipment Solutions, LLC, Haven, KS (US)

( * ) Notice: Subject to any disclaimer, the term of this patent is extended or adjusted under 35 U.S.C. 154(b) by 739 days.

(21) Appl. No.: 17/306,733

(22) Filed: May 3, 2021

(65) Prior Publication Data

US 2021/0337720 A1 Nov. 4, 2021

Related U.S. Application Data

(60) Provisional application No. 63/019,251, filed on May 1, 2020.

(51) Int. Cl.
*A01C 7/10* (2006.01)
*A01C 7/08* (2006.01)
(Continued)

(52) U.S. Cl.
CPC ............. *A01C 7/105* (2013.01); *A01C 7/088* (2013.01); *G05D 7/0623* (2013.01); *G05D 7/0682* (2013.01); *G01S 19/42* (2013.01)

(58) Field of Classification Search
CPC ......... A01C 7/105; A01C 7/088; A01C 7/102; A01C 7/10; A01C 7/08; A01C 7/00; G01S 19/42; G01S 19/39; G01S 19/38; G01S 19/00; G05D 7/0623; G05D 7/0682; G05D 7/0617; G05D 7/06; G05D 7/00; G05D 7/0676; G05D 7/0629
See application file for complete search history.

(56) References Cited

U.S. PATENT DOCUMENTS 5,406,897 A    4/1995   Pingry
6,834,600 B1  12/2004   Clewell et al.
(Continued)

OTHER PUBLICATIONS

International Search Report and Written Opinion of International Searching Authority dated Aug. 4, 2021, for Applicant's corresponding PCT Application No. PCT/US2021/30511.

*Primary Examiner* — Christopher J. Novosad
(74) *Attorney, Agent, or Firm* — Jeffrey L. Thompson; Thompson Law, P.A.

(57) ABSTRACT

An agricultural seeder (10) for research plots includes a front gang (21) of planting units (22) and a rear gang (23) of planting units (24) spaced a distance behind the front gang. Metering systems (14) are provided for metering seed to the planting units (22, 24) of the front and rear gangs (21, 23). A tripping system (27) is used to start and stop the seed metering systems (14) and to change seed between plots while planting. A programmable logic controller (28) is programmed with the distance between the front and rear gangs (21, 23) and is used to delay the tripping of the metering system (26) for the rear gang (23) relative to the metering system (25) for the front gang (21) until the seeder (10) has traveled the distance (L) between the front and rear gangs (21, 23). The delayed tripping for the rear gang (23) keeps the planted rows and alleyways created by the front gang planting units (22) laterally aligned with those created by the rear gang planting units (24).

22 Claims, 6 Drawing Sheets

(51) Int. Cl.
 *G01S 19/42* (2010.01)
 *G05D 7/06* (2006.01)

(56) References Cited

U.S. PATENT DOCUMENTS

| | | |
|---|---|---|
| 10,194,572 B2 | 2/2019 | Roberge et al. |
| 2001/0000806 A1 | 5/2001 | Carr et al. |
| 2017/0181372 A1 | 6/2017 | Unruh |

RESEARCH PLOT SEEDER WITH PLANTING UNITS CONTROLLED TO TRIP AT DIFFERENT TIMES TO CREATE ALIGNED ALLEYWAYS

TECHNICAL FIELD OF THE INVENTION

The present invention relates generally to seed planters, and in particular to seed planters used for planting research plots with multiple gangs of planting units to accommodate narrow row spacings.

BACKGROUND ART

Seed research plot fields are commonly used by researchers to obtain yield and growth data for different seed types. Such fields typically contain several individual seed plots arranged in the same field, with each plot containing one or more rows, and with alleyways separating the end of the rows of one plot from the beginning of the rows of the next plot. The plot fields are typically planted using a planter that plants multiple plots with alleyways between each plot during each pass of the planter through the field.

No-till farming has become popular with farmers to conserve soil moisture, maintain soil structure and ground cover, and reduce expensive tillage trips over the field. However, the increased crop residue and/or cover crop in a no-till field can pose additional challenges for planters. Planters designed for conventional tillage typically have planting units lined up on the same toolbar or gang. However, in high residue planting conditions the residue has no where to go, and the planter quickly becomes plugged. Commercial farmers are able to handle the additional residue by staggering the planting units on their planter, thus allowing the residue to pass through and between the planting units.

Researchers need to be able to do research in the same conditions that farmers are planting into. The problem with research is that there are typically alleyways in a research plot field that separate one variety from another so the researcher can tell which variety does better than the other, etc. These alleyways are kept as small as possible, so the end-of-field effect is minimized. A typical alleyway in a research plot field is 30 inches. The typical stagger between front and rear gangs of planting units on a high residue no-till plot planter is 36 inches. In present research planters the front gang is into the next range before the rear gang is out of the previous range. Thus, the alleyway between plots is poorly defined, and the researcher cannot determine which plants are in which range in the plot. Harvesting the field when the crop is ready is difficult due to the overlap. A common solution to the problem has been for the researcher to cut an alleyway that is wider, such as 40 inches, by mowing, rototilling or spraying. This is labor intensive and adds extra expense, as well as the problem of not knowing for sure if the researcher took out all of the right plants to make sure there is no mixing of the varieties.

SUMMARY OF THE INVENTION

Technical Problem

There is a need in the industry for a research plot planter with multiple gangs of staggered planting units that provides well-defined alleyways between adjacent plots in a field.

There is also a need for a research plot planter that can be used in high crop residue conditions without plugging, while still providing well-defined alleyways between adjacent plots.

There is a further need for an agricultural seeding implement that controls multiple gangs of planting units to start and stop at different times to compensate for the distance between the front and rear gangs and any intermediate gangs to allow the starting and stopping locations for the seed metering of the front gang of planting units to be laterally aligned with the starting and stopping locations for the seed metering of the rear gang and any intermediate gangs of planting units.

There is a further need for an agricultural seeding implement with a tripping system to start and stop multiple gangs of seed metering systems and to control the timing for changing seed varieties and other planter functions, and a controller to delay the tripping for the rear gang and any intermediate gangs of seed metering systems based on the distance between the front and rear gangs and any intermediate gangs to keep the planted rows and alleyways created by the planting units laterally aligned.

Solution to Problem

An agricultural seeder for research plots according to the present invention includes a front gang of planting units and a rear gang of planting units spaced a distance behind the front gang. Metering systems are provided for metering seed to the planting units of the front and rear gangs. A tripping system is used to start and stop the seed metering systems and to change seed between plots while planting. A programmable logic controller is programmed with the distance between the front and rear gangs and is used to delay the tripping of the metering system for the rear gang relative to the metering system for the front gang until the seeder has traveled the distance between the front and rear gangs. The agricultural seeder can also include one or more intermediate gangs of planting units positioned between the front and rear gangs, with the controller programmed to delay the tripping of the metering system for the intermediate gang relative to the metering system for the front gang. The delayed tripping for the rear and intermediate gangs relative to the front gang keeps the planted rows and alleyways created by the front gang planting units laterally aligned with those created by the planting units of the rear and intermediate gangs.

According to one aspect of the present invention, an agricultural seeder for research plots is provided, comprising: a front gang of planting units; a rear gang of planting units spaced a distance behind the front gang of planting units; a first metering system for metering seed for at least one of the planting units in the front gang of planting units; a second metering system for metering seed for at least one of the planting units in the rear gang of planting units; and a controller that receives a tripping signal from a tripping system. The controller causes the first and second metering systems to trip at different times to compensate for the distance between the front and rear gangs so that starting and stopping locations for seed metering for the front gang of planting units is laterally aligned with starting and stopping locations for seed metering for the rear gang of planting units, thereby creating aligned alleyways between plots in a field.

According to another aspect of the present invention, a method of planting seed is provided, comprising: providing a seed planter comprising a front gang of planting units, a rear gang of planting units spaced a distance behind the front gang of planting units, a first metering system for metering seed for at least one of the planting units in the front gang of planting units, and a second metering system for metering seed for at least one of the planting units in the rear gang of planting units; determining a position of the planter in a field; and tripping the first and second metering systems based on the determined position of the planter to start a sequence of planter functions to change from one plot to another. The tripping step includes tripping the first and second metering systems at different times to compensate for the distance between the front and rear gangs and to cause starting and stopping locations for seed metering for the front gang of planting units to be laterally aligned with starting and stopping locations for seed metering for the rear gang of planting units to create an aligned alleyway between plots in the field.

According to another aspect of the present invention, an agricultural seeder is provided, comprising: a front gang of planting units having at least one first metering system for metering seeds; a rear gang of planting units spaced a distance behind the front gang of planting units, the rear gang of planting units having at least one second metering system for metering seeds; and a controller for controlling the first and second metering systems to start and stop at different times to compensate for the distance between the front and rear gangs.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF DRAWINGS

The present invention will become more clearly appreciated as the disclosure of the invention is made with reference to the accompanying drawings. In the drawings.

DESCRIPTION OF EMBODIMENTS

An agricultural seeder according to the present invention will now be described with reference to FIGS. 1 to 7 of the accompanying drawings.

Figure 1:
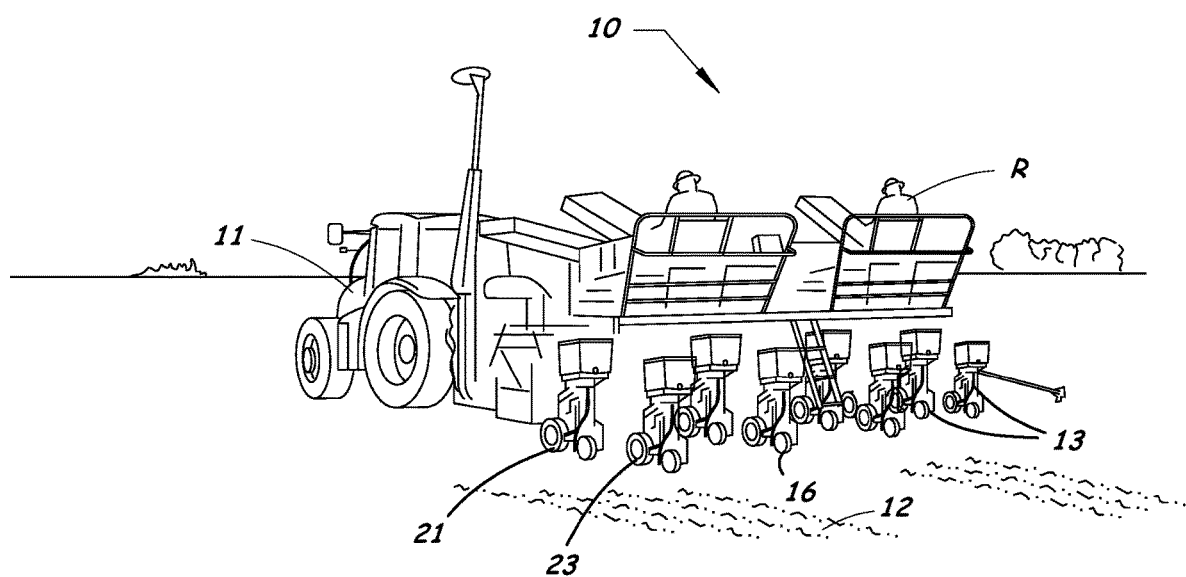
FIG. 1 is a perspective view of a research plot planter with offset front and rear gangs of planting units being pulled by a tractor through a research plot field.

FIG. 1 shows a research plot planter 10 being pulled by a tractor 11 through a research plot field 12. The research plot field 12 is typically used by researchers to obtain yield and growth data for different seed types, and therefore contains several individual seed plots, with each plot containing one or more rows and with alleyways separating the end of the rows of one plot from the beginning of the rows of the next plot. For example, the research plot field 12 may have several hundred individual plots separated by alleyways that mark the end of one plot and the beginning of another plot.

The planter 10 shown in FIG. 1 has eight row units 13 that plant eight rows at a time as the planter 10 makes a pass through the field. Each row unit 13 has, among other things, a furrow opener, a seed metering system 14, a seed tube 15 for guiding seeds from the seed metering system 14 into the furrow created by the opener, and a furrow closing assembly 16. One or more researchers R may be seated on the planter 10 to monitor the planter functions and to ensure that the proper seed varieties are loaded into the planter row units 13 for each plot.

The row units 13 shown in FIG. 1 are staggered with half of the row units arranged in a front gang 21, and half of the row units arranged in a rear gang 23. The staggering allows the planter 10 to handle the increased crop residue found in no-till field conditions without plugging. Although only two gangs of row units are illustrated in FIG. 1, it will be understood that one or more additional gangs of row units can also be used, such as an arrangement with three gangs of row units, including a front gang, an intermediate gang, and a rear gang.

Figure 2:
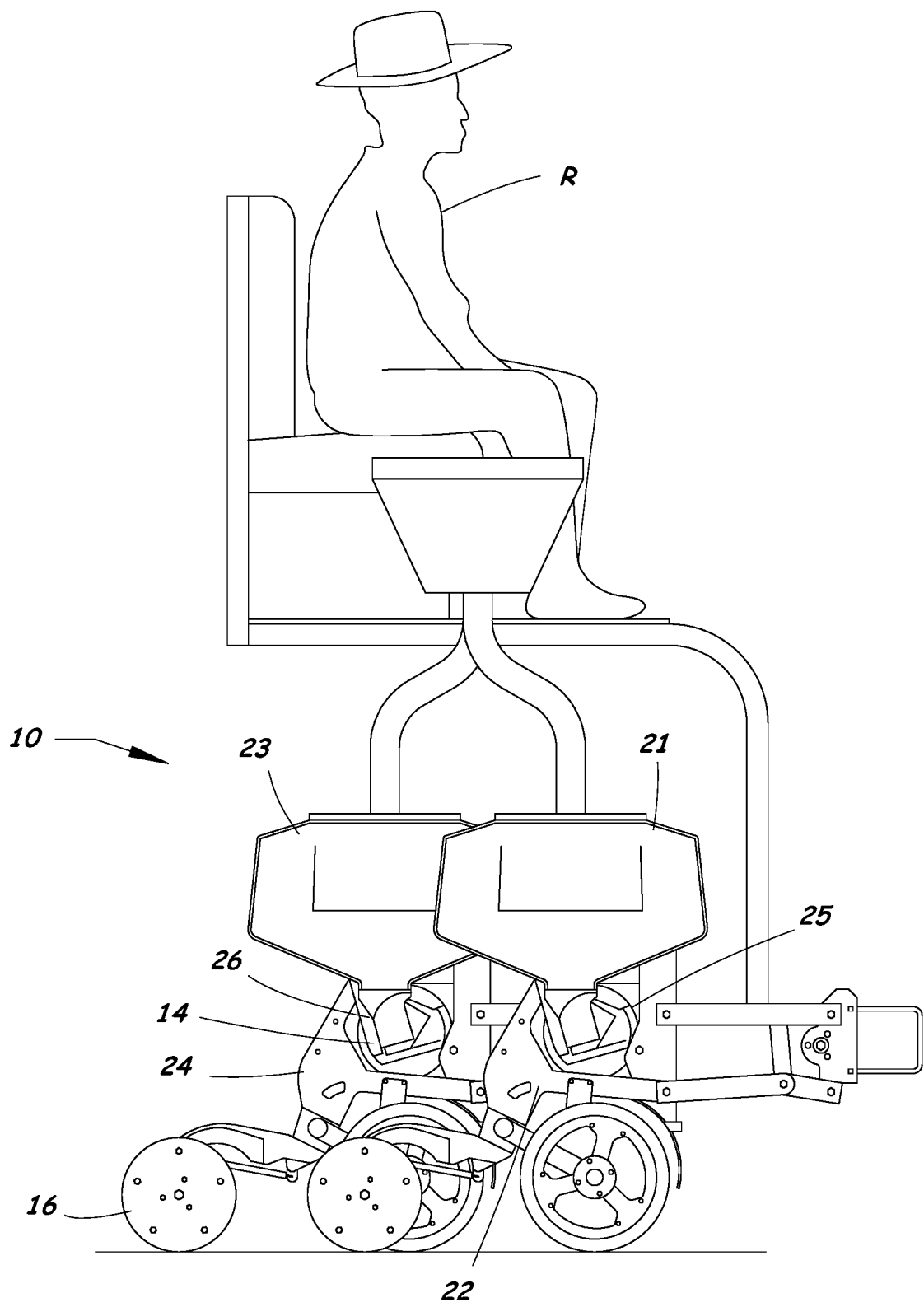
FIG. 2 is an elevation side view of a research plot planter with offset front and rear gangs of planting units.

FIG. 2 illustrates a side view of the plot planter 10 having a front gang 21 of planting units 22 and a rear gang 23 of planting units 24. The rear gang 23 of planting units 24 is spaced a distance behind the front gang 21 of planting units 22. A seed metering system 14 is associated with each of the planting units 22, 24. The seed metering systems 14 for the planting units 22 in the front gang 21 are designated with reference numeral 25, and the seed metering systems for the planting units in the rear gang 23 are designated with reference numeral 26.

The seed metering systems 14 operate to pickup and singulate seeds from a seed chamber 17, drop or eject the seeds down a seed tube 15, wipe seeds from the seed plate 18 or cone meter to ensure a crip start and stop to each alleyway A, and remove any extra seed S from the seed chamber 17 before the seed for the next plot is loaded by the operator.

Figure 5:
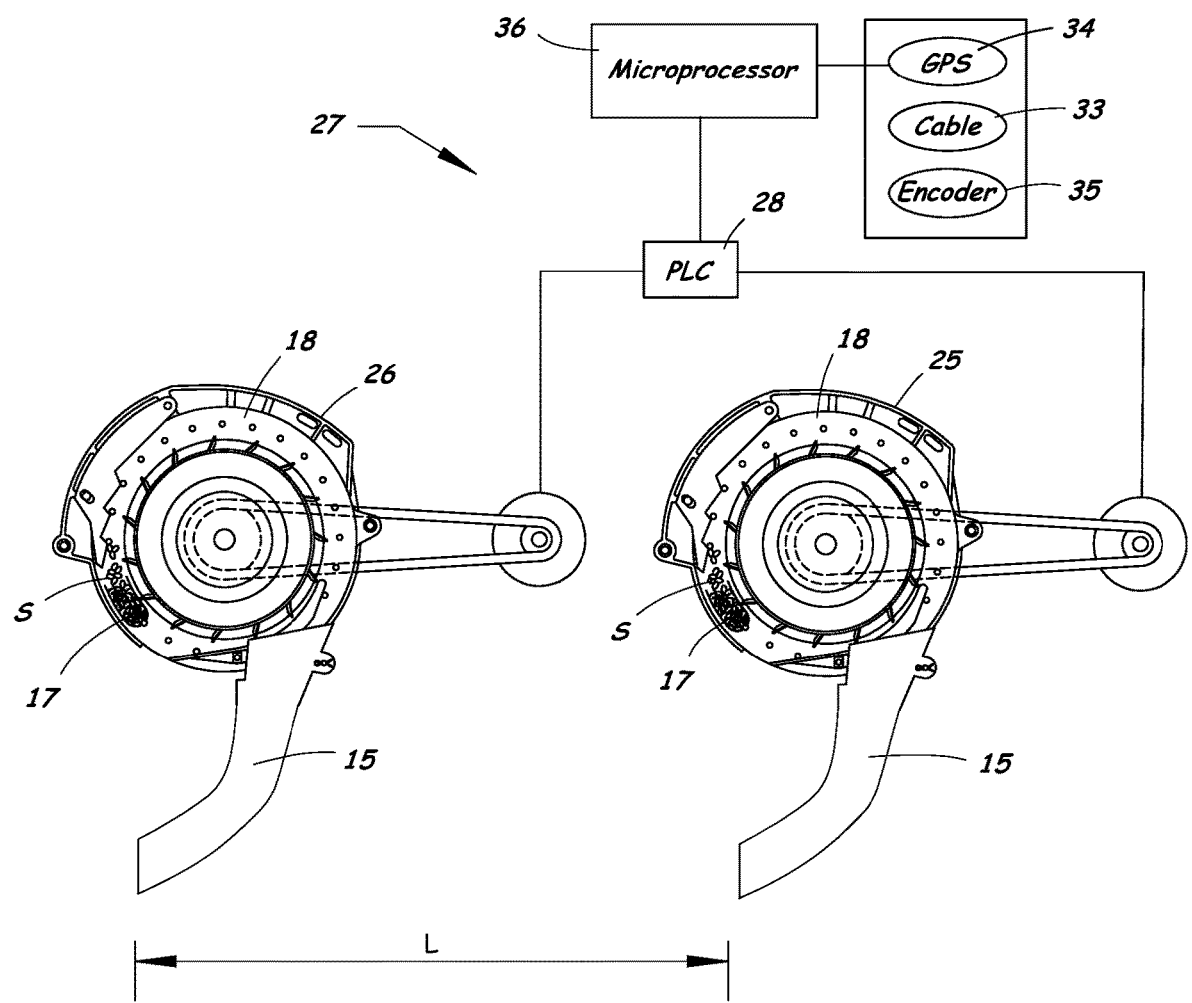
FIG. 5 is an illustration of offset planter row units with rotating seed plate metering mechanisms and a controller for starting and stopping the metering mechanisms at different times according to the present invention.

The metering systems 14 can be, for example, commercially available seed metering mechanisms that are currently used with research plot planters. For example, FIG. 5 illustrates a metering mechanism with a rotating seed plate for picking up and transporting seeds from a seed chamber to a release point, which can be used in the present invention. Such a plate-type metering mechanism is described in the Applicant's U.S. Pat. No. 9,622,403, the content of which is incorporated herein by reference. The longitudinal distance in the direction of travel between the outlets of the seed tubes 15 of the front gang 21 and the outlets of the seed tubes 15 of the rear gang 23 is depicted by the reference numeral "L" in FIG. 5.

Figure 6:
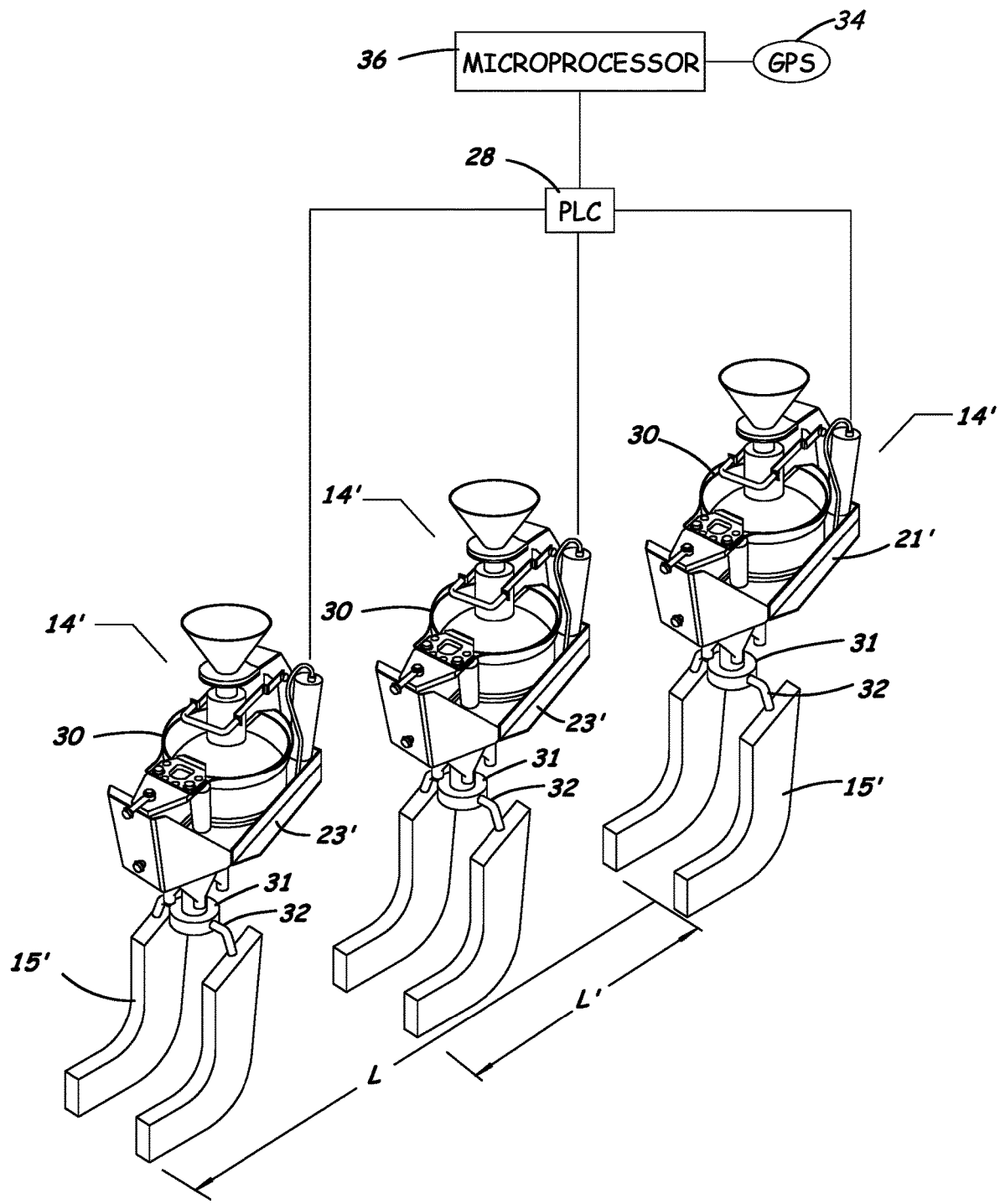
FIG. 6 is an illustration of offset planter row units with cone meters equipped with spinner dividers for metering seed to multiple seed outlets on the front, intermediate and rear gangs, and a controller for starting and stopping the meters at different times according to the present invention.
Figure 7:
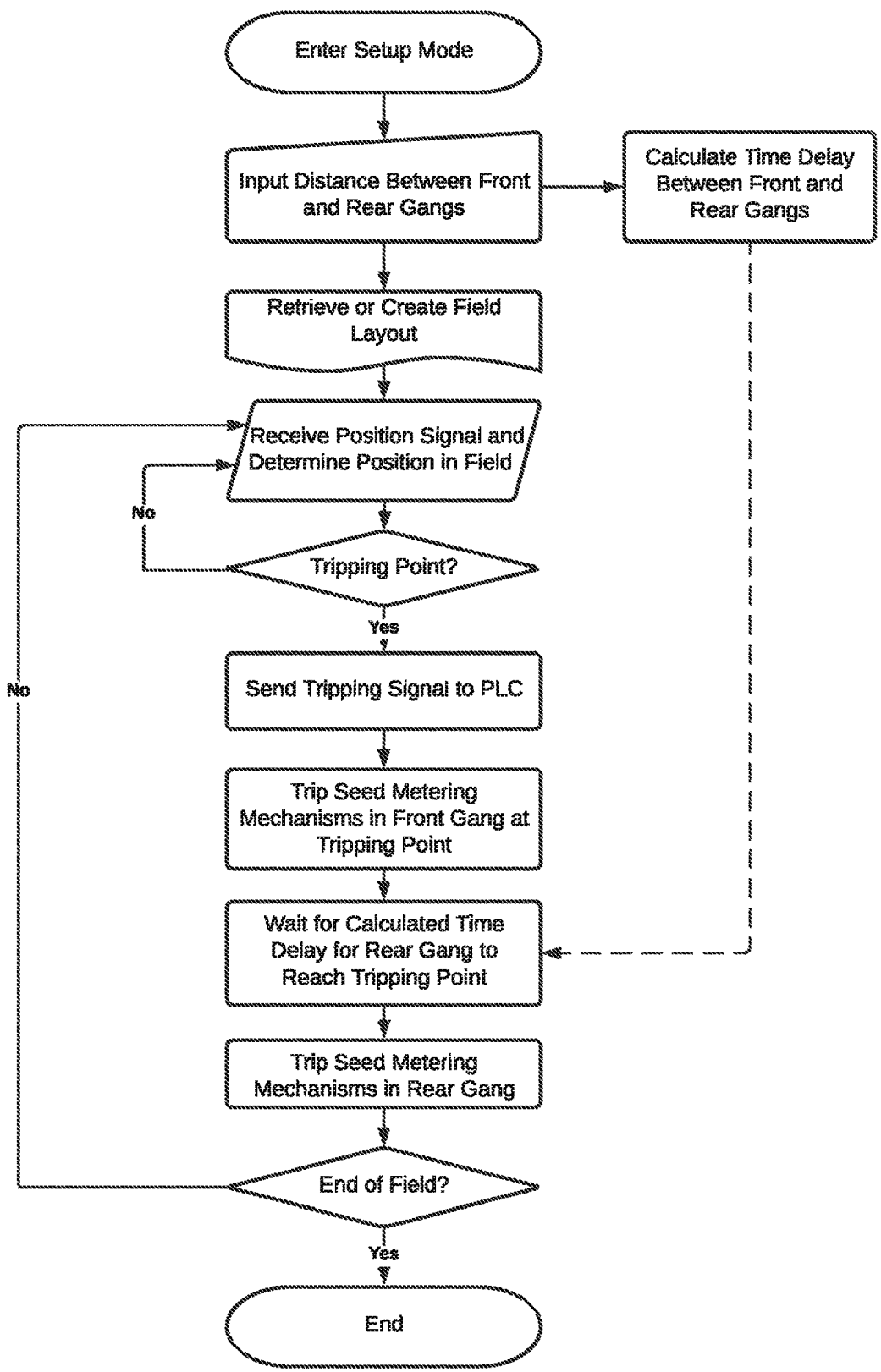
FIG. 7 is a flowchart diagram showing a seeding method according to the present invention in which front and rear gangs of seed metering systems are tripped at different times.

For another example, FIG. 6 illustrates a cone metering mechanism that can be used in the present invention. A suitable cone-type seed metering mechanism is available commercially as the SRES Belt Cone from Seed Research Equipment Solutions, LLC.

The planting units 22, 24 can be commercially available row units for planters, drills or seeders. The staggered planting units 22, 24 with cone metering mechanisms are particularly suitable for planting plots with narrow spacings, such as plots for cereal grains or smaller seeds, especially in high residue conditions.

In the example embodiment illustrated in FIG. 6, the metering system 14' for a front gang 21' of row units can be a cone meter 30 equipped with a spinner divider 31 with multiple outlets 32 for metering seed to multiple seed tubes 15 or other seed delivery devices on the front gang 21'. Similarly, the metering systems 14' for intermediate and rear gangs 23' of row units can be cone meters with spinner dividers with multiple outlets for metering seed to multiple seed outlets on the intermediate and rear gangs 23', respectively. The longitudinal distance in the direction of travel between the outlets of the seed tubes 15' of the front gang 21' and the outlets of the seed tubes 15' of the rear gang 23' is depicted by the reference numeral L in FIG. 6, while the longitudinal distance between the outlets of the seed tubes 15' of the front gang 21' and the outlets of the seed tubes of the intermediate gang 23' is depicted by the reference numeral L'.

The research plot planter 10 has several planter functions that occur in sequence as the planter 10 makes a pass through the field. Many of these planter functions involve the seed meter assembly 14 and its process of changing the seed variety from one plot to the next. The process of starting the sequence of planter functions to change from one seed plot to the next is referred to as "tripping" the planter.

A tripping system 27 is provided for tripping the first and second metering systems 25, 26 to start and stop the seed metering systems and to control the timing for changing seed varieties and other related planter functions between the plots. The tripping system 27 includes a position sensing device 28, which can be, for example, a cable mechanism 33, a GPS system 34, a rotary encoder 35, or combinations thereof.

For example, a cable tripping system as disclosed in U.S. Pat. No. 7,337,733 can be used as the tripping system 27. The cable tripping system includes a cable with a series of sensor buttons secured to the cable at locations along its length to provide measured tripping points as the planter implement 10 traverses the field.

For another example, the tripping system 27 can be a GPS-based tripping system as disclosed in U.S. Pat. No. 9,622,403. In this case, a GPS position sensing device 34 is used together with a microprocessor 36 and computer algorithm to determine a precise location of the planter 10 in the field based on GPS signals, the speed of the planter, and a timer function. The microprocessor 36 is used to determine the tripping points and control the planter functions based on the programmed layout of the field and the GPS location of the planter 10 within the field.

The tripping system 27 can also use an encoder 35 or other mechanical device to measures a distance traveled by the planter to determine when the row units should be tripped. An encoder can also be used together with a GPS-based tripping system or a cable tripping system to provide additional inputs for the tripping system.

A programmable logic controller (PLC) 28 is provided for controlling the sequence of operations of the seed metering systems when a tripping signal is received from the tripping system 27. The PLC 28 is programmed with the distance between the front and rear gangs 21, 23, among other things. The PLC 28 is programmed to delay the tripping of the metering system 26 for the rear gang 23 relative to the metering system 25 for the front gang 21 until the seeder 20 has traveled the distance between the front and rear gangs 21, 23. The delayed tripping for the rear gang 23 keeps the planted rows and alleyways created by the front gang planting units 22 laterally aligned with those created by the rear gang planting units 24. If the planter has an intermediate gang, the PLC 28 is also programmed with the distance between the front and intermediate gangs and to delay the tripping of the metering system for the intermediate gang relative to the metering system for the front gang until the seeder has traveled the distance between the front and intermediate gangs.

Figure 4:
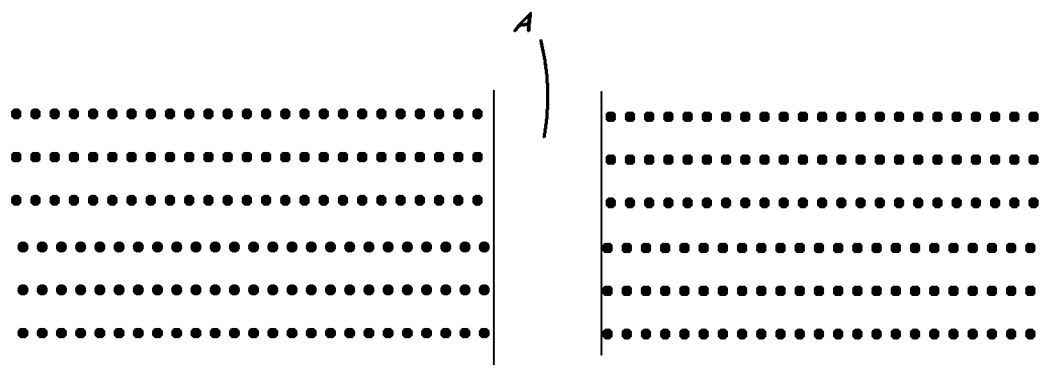
FIG. 4 is a diagram showing a research plot planted with a seeder according to the present invention, in which the front and rear gangs are tripped at different times to create aligned row ends and a well defined alleyway.

The PLC 28 controls the tripping sequence for the first and second metering systems 25, 26 so that the seed metering systems of multiple gangs are tripped at different times to compensate for the distance between the gangs. As a result, the starting and stopping locations for the seed metering for the front gang 21 of planting units 22 is laterally aligned with the starting and stopping locations for the seed metering for the rear gang 23 and any intermediate gangs of planting units 24 to create aligned alleyways A between the various plots in the field, as illustrated in FIG. 4.

Figure 3:
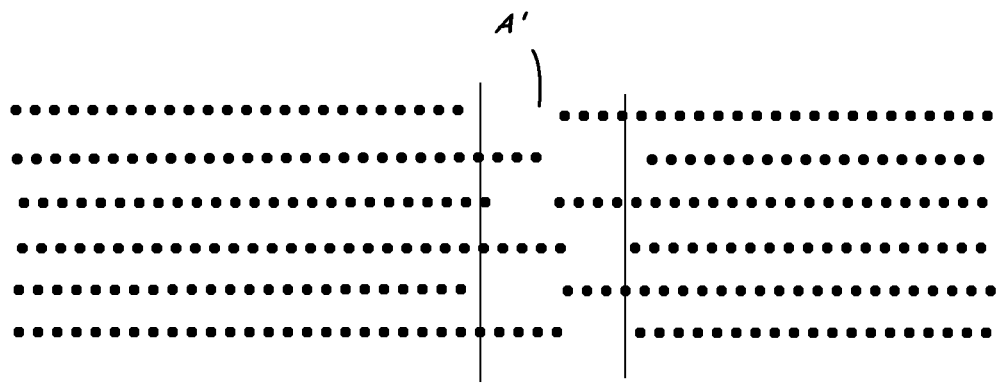
FIG. 3 is a diagram showing a research plot planted with a conventional seeder having front and rear gangs of planting units, in which the front and rear gangs are tripped at the same time leaving misaligned ends of the rows with a poorly defined alleyway.

The present invention provides a solution to the prior art problem illustrated in FIG. 3, in which the front and rear gangs are tripped at the same time leaving misaligned ends of the rows with a poorly defined alleyway A'.

An agricultural seeder according to the present invention has been described above. A method of planting seed according to the present invention will now be described with reference to the flowchart shown in FIG. 7.

The method includes an initial step of inputting the distance L between the front and rear gangs of planter units into the controller. If the implement has three or more gangs of planter units, the distance L between the front and rear gangs of planter units is input into the controller, as well as the distance L' between the front and intermediate gangs of planter units. The input distances L and L' are used by the controller to calculate a time delay corresponding to the time required for the rear and intermediate gangs to reach a tripping point in the field after the front gang passes the tripping point. The time delay can be calculated or adjusted on-the-go based on the detected traveling speed of the planter. Alternatively, the time delay can be set based on a typical operating speed of the planter while planting.

The controller retrieves or generates a field layout with the various plot placements, alleyway locations, field borders, and tripping points for the research field being planted.

A position signal indicating the planter's position in the field is received from the GPS device or other position sensor and monitored until the planter reaches a predetermined tripping point in the field. When the planter reaches a tripping point, a tripping signal is sent to the PLC. The PLC trips the seed metering mechanisms in the front gang of row units, thereby starting a programmed sequence of planter functions for the front gang of row units to change seed varieties for the next plot and leave an unplanted area for an alleyway between the plots.

After waiting for the calculated time delay, the PLC trips the seed metering mechanisms in the rear gang of row units, thereby starting the same programmed sequence of planter functions for the rear gang of row units to change seed varieties for the next plot and leave an unplanted area for the alleyway. Similarly, if the planter has one or more intermediate gangs of row units, the PLC trips the seed metering mechanisms for the intermediate gangs of row units after waiting for an appropriate time delay from the tripping of the front gang of row units.

The process then repeats as the next tripping point in the field is reached. When the end of the field is reached, the process ends.

By tripping the metering systems for the front and rear gangs and any intermediate gangs at different times, the process compensates for the front-to-rear distance between the gangs and causes the starting and stopping locations for seed metering for the front gang of planting units to be laterally aligned with the starting and stopping locations for seed metering for the rear and intermediate gangs of planting units. As a result, aligned alleyways are created between the plots in the field.

While the invention has been described in connection with specific embodiments thereof, it is to be understood that this is by way of illustration and not of limitation, and the scope of the appended claims should be construed as broadly as the prior art will permit.

INDUSTRIAL APPLICABILITY

The industrial applicability of the present invention is believed to be apparent from the description herein and the nature of the invention. The present invention can be used with research plot planters and other agricultural seeders.

What is claimed is:

1. An agricultural seeder for research plots, comprising:
   a front gang of planting units;
   a rear gang of planting units spaced a distance behind said front gang of planting units;
   a first metering system for metering seed for at least one of the planting units in said front gang of planting units;
   a second metering system for metering seed for at least one of the planting units in said rear gang of planting units; and
   a controller that receives a tripping signal from a tripping system and causes said first and second metering systems to trip at different times to compensate for the distance between said front and rear gangs of planting units so that starting and stopping locations for seed metering for the front gang of planting units is laterally aligned with starting and stopping locations for seed metering for the rear gang of planting units, thereby creating aligned alleyways between plots in a field.

2. The agricultural seeder according to claim 1, wherein said first and second metering systems each comprises a metering mechanism with a rotating seed plate for picking up and transporting seeds from a seed chamber to a release point.

3. The agricultural seeder according to claim 1, wherein said first metering system comprises a first cone meter used to deliver seeds to at least one outlet on said front gang of planting units, and said second metering system comprises a second cone meter used to deliver seeds to at least one outlet on said rear gang of planting units.

4. The agricultural seeder according to claim 1, wherein said first metering system comprises a first cone meter and a first divider with multiple outlets for metering seeds to multiple planting units on said front gang of planting units.

5. The agricultural seeder according to claim 4, wherein said second metering system comprises a second cone meter and a second divider with multiple outlets for metering seeds to multiple planting units on said rear gang of planting units.

6. The agricultural seeder according to claim 1, wherein said tripping system comprises a cable tripping system.

7. The agricultural seeder according to claim 1, wherein said tripping system comprises a GPS-based tripping system with a GPS device and microprocessor used to determine a location of the seeder in the field and to provide tripping signals based on the determined location.

8. The agricultural seeder according to claim 1, wherein said tripping system comprises an encoder.

9. The agricultural seeder according to claim 1, wherein said controller comprises a programmable logic controller programmed with the distance between the front and rear gangs of planting units and a function to delay the tripping of the second metering system relative to the first metering system until the seeder has traveled the distance between the front and rear gangs of planting units, thereby keeping the planted rows and alleyways created by the front gang of planting units laterally aligned with the planted rows and alleyways created by the rear gang of planting units.

10. The agricultural seeder according to claim 1, wherein said planting units in the rear gang of planting units are arranged laterally between and longitudinally behind the planting units in the front gang of planting units.

11. The agricultural seeder according to claim 1, further comprising at least one intermediate gang of planting units positioned between said front and rear gangs of planting units, and a third metering system for metering seed for at least one of the planting units in said intermediate gang of planting units, wherein said controller causes said first and third metering systems to trip at different times to compensate for the distance between said front and intermediate gangs of planting units so that starting and stopping locations for seed metering for the front gang of planting units is laterally aligned with starting and stopping locations for seed metering for the intermediate gang of planting units.

12. A method of planting seed, comprising:
   providing a seed planter comprising a front gang of planting units, a rear gang of planting units spaced a distance behind said front gang of planting units, a first metering system for metering seed for at least one of the planting units in said front gang of planting units, and a second metering system for metering seed for at least one of the planting units in said rear gang of planting units;
   determining a position of the planter in a field; and
   tripping the first and second metering systems based on the determined position of the planter to start a sequence of planter functions to change from one plot to another;
   wherein said tripping comprises tripping said first and second metering systems at different times to compensate for the distance between said front and rear gangs of planting units and to cause starting and stopping locations for seed metering for the front gang of planting units to be laterally aligned with starting and stopping locations for seed metering for the rear gang of planting units to create an aligned alleyway between plots in the field.

13. The method of planting seed according to claim 12, wherein said first and second metering systems each comprises a metering mechanism with a rotating seed plate for picking up and transporting seeds from a seed chamber to a release point.

14. The method of planting seed according to claim 12, wherein said first metering system comprises a cone meter that delivers seeds to at least one outlet on said front gang of planting units, and said second metering system comprises a second cone meter used to deliver seeds to at least one outlet on said rear gang of planting units.

15. The method of planting seed according to claim 14, wherein said first metering system comprises a first divider with multiple outlets for metering seeds to multiple planting units on said front gang of planting units, and said second metering system comprises a second divider with multiple outlets for metering seeds to multiple planting units on said rear gang of planting units.

16. The method of planting seed according to claim 12, further comprising using a GPS determined location of the seeder in the field to trip said first and second metering systems.

17. The method of planting seed according to claim 12, further comprising using a programmable logic controller programmed with the distance between the front and rear gangs of planting units to delay the tripping of the second metering system relative to the first metering system until the seeder has traveled the distance between the front and rear gangs of planting units, thereby keeping the planted rows and alleyways created by the front gang of planting units laterally aligned with the planted rows and alleyways created by the rear gang of planting units.

18. The method of planting seed according to claim 12, further comprising providing at least one intermediate gang of planting units positioned between said front and rear gangs of planting units, and a third metering system for metering seed for at least one of the planting units in said intermediate gang of planting units, and tripping said first and third metering systems at different times to compensate for the distance between said front and intermediate gangs of planting units so that starting and stopping locations for seed metering for the front gang of planting units is laterally aligned with starting and stopping locations for seed metering for the intermediate gang of planting units.

19. An agricultural seeder, comprising:
 a front gang of planting units having at least one first metering system for metering seeds;
 a rear gang of planting units spaced a distance behind said front gang of planting units, said rear gang of planting units having at least one second metering system for metering seeds; and
 a controller for controlling said first and second metering systems to start and stop at different times to compensate for the distance between said front and rear gangs of planting units.

20. The agricultural seeder according to claim 19, further comprising a tripping system that starts a sequence of planter functions to change seed being planted at predetermined locations in a field, and wherein said controller controls the tripping system to trip the first and second metering systems at different times to compensate for the distance between said front and rear gangs of planting units and to cause starting and stopping locations for seed metering for the front gang of planting units to be laterally aligned with starting and stopping locations for seed metering for the rear gang of planting units.

21. The agricultural seeder according to claim 20, wherein said controller comprises a programmable logic controller programmed with the distance between the front and rear gangs of planting units to delay the tripping of the second metering system relative to the first metering system until the seeder has traveled the distance between the front and rear gangs of planting units.

22. The agricultural seeder according to claim 19, further comprising at least one intermediate gang of planting units positioned between said front and rear gangs of planting units, and said at least one intermediate gang of planting units having at least one third metering system for metering seeds, and wherein said controller causes said first and third metering systems to start and stop at different times to compensate for the distance between said front and intermediate gangs of planting units.

* * * * *